US008533315B2

(12) United States Patent
Godwin (10) Patent No.: US 8,533,315 B2
(45) Date of Patent: Sep. 10, 2013

(54) SYSTEMS AND METHODS FOR MONITORING PERFORMANCE OF FIELD ASSETS

(75) Inventor: Bryan W. Godwin, Round Rock, TX (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 461 days.

(21) Appl. No.: 11/923,785

(22) Filed: Oct. 25, 2007

(65) Prior Publication Data

US 2009/0113038 A1 Apr. 30, 2009

(51) Int. Cl.
*G06F 15/173* (2006.01)

(52) U.S. Cl.
USPC ........... 709/224; 700/244; 235/383; 235/385; 235/381

(58) Field of Classification Search
USPC ......... 709/217–219, 223–227, 200; 700/244, 700/9, 231–236; 194/205–217; 235/381, 235/383; 340/5.9–5.92, 539.1; 702/179–188; 705/7–11, 14.64–14.65
See application file for complete search history.

(56) References Cited

U.S. PATENT DOCUMENTS

| | | | |
|---|---|---|---|
| 3,784,737 A | 1/1974 | Waehner | 178/6 |
| 4,369,442 A | 1/1983 | Werth et al. | 340/825.35 |
| 4,412,292 A | 10/1983 | Sedam et al. | 364/479 |
| 4,454,670 A | 6/1984 | Bachmann et al. | 40/584 |
| 4,553,211 A | 11/1985 | Kawasaki et al. | 364/479 |
| 4,611,205 A | 9/1986 | Eglise | 340/825.35 |
| 4,661,862 A | 4/1987 | Thompson | 358/335 |
| 4,677,565 A | 6/1987 | Ogaki et al. | 364/479 |
| 4,766,548 A | 8/1988 | Cedrone et al. | 364/479 |
| 4,850,009 A | 7/1989 | Zook et al. | 379/96 |
| 4,926,996 A | 5/1990 | Eglise et al. | 194/212 |
| 4,954,697 A | 9/1990 | Kokubun et al. | 235/381 |
| 5,029,098 A * | 7/1991 | Levasseur | 705/7.31 |
| 5,050,769 A * | 9/1991 | Levasseur | 221/1 |
| 5,077,582 A | 12/1991 | Kravette et al. | 355/206 |
| 5,090,589 A | 2/1992 | Brandes et al. | 221/2 |
| 5,091,713 A | 2/1992 | Horne et al. | 340/541 |
| 5,117,407 A | 5/1992 | Vogel | 369/30 |
| 5,184,179 A | 2/1993 | Tarr et al. | 355/206 |
| 5,207,784 A | 5/1993 | Schwartzendruber | 221/6 |
| 5,239,480 A | 8/1993 | Huegel | 364/479 |
| 5,255,819 A | 10/1993 | Peckels | 222/1 |

(Continued)

FOREIGN PATENT DOCUMENTS

DE 41 40 450 A1 6/1993
EP 0 564 736 A1 10/1993

(Continued)

OTHER PUBLICATIONS

Skywire Provides Details of Wireless 'VendView' System; Vending Times, Sep. 1994.

(Continued)

*Primary Examiner* — Greg C Bengzon (57) ABSTRACT

A system and method for monitoring performance of field assets are disclosed. A method may include transmitting packets on a shared bus located in a field asset may be captured. The captured packets may be analyzed to determine one or more operational parameters associated with one or more peripheral devices coupled to the shared bus. The one or more operational parameters may be analyzed to determine an operational efficiency of the field asset.

26 Claims, 3 Drawing Sheets

(56) References Cited

U.S. PATENT DOCUMENTS

| | | | |
|---|---|---|---|
| 5,282,127 A | 1/1994 | Mii | 364/479 |
| 5,323,155 A | 6/1994 | Iyer et al. | 341/51 |
| 5,337,253 A | 8/1994 | Berkovsky et al. | 364/479 |
| 5,339,250 A | 8/1994 | Durbin | 364/479 |
| 5,371,348 A | 12/1994 | Kumar et al. | 235/472 |
| 5,386,360 A | 1/1995 | Wilson et al. | 364/146 |
| 5,400,246 A | 3/1995 | Wilson et al. | 364/146 |
| 5,418,945 A | 5/1995 | Carter et al. | 395/600 |
| 5,445,295 A | 8/1995 | Brown | 221/3 |
| 5,505,349 A | 4/1996 | Peckels | 222/641 |
| 5,507,411 A | 4/1996 | Peckels | 222/1 |
| 5,561,604 A | 10/1996 | Buckley et al. | 364/479.05 |
| 5,608,643 A | 3/1997 | Wichter et al. | 364/479.14 |
| 5,620,079 A | 4/1997 | Molbak | 194/217 |
| 5,649,308 A | 7/1997 | Andrews | 370/334 |
| 5,671,362 A | 9/1997 | Cowe et al. | 395/228 |
| 5,701,252 A | 12/1997 | Facchin et al. | 364/479 |
| 5,708,223 A | 1/1998 | Wyss | 73/865.9 |
| 5,769,269 A | 6/1998 | Peters | 221/7 |
| 5,787,149 A | 7/1998 | Yousefi et al. | 379/59 |
| 5,790,431 A * | 8/1998 | Ahrens et al. | 718/104 |
| 5,794,144 A | 8/1998 | Comer et al. | 455/426 |
| 5,805,997 A | 9/1998 | Farris | 455/466 |
| 5,815,652 A | 9/1998 | Ote et al. | 395/183.07 |
| 5,818,603 A | 10/1998 | Motoyama | 358/296 |
| 5,822,216 A | 10/1998 | Satchell, Jr. et al. | 364/479.01 |
| 5,841,866 A | 11/1998 | Bruwer et al. | 380/23 |
| 5,842,597 A | 12/1998 | Kraus et al. | 221/150 R |
| 5,844,808 A | 12/1998 | Konsmo et al. | 364/479.14 |
| 5,850,187 A | 12/1998 | Carrender et al. | 340/825.54 |
| 5,860,362 A | 1/1999 | Smith | 101/494 |
| 5,862,517 A | 1/1999 | Honey et al. | 364/559 |
| 5,867,688 A | 2/1999 | Simmon et al. | 395/500 |
| 5,892,758 A | 4/1999 | Argyroudis | 370/335 |
| 5,898,904 A | 4/1999 | Wang | 455/31.3 |
| 5,905,442 A | 5/1999 | Mosebrook et al. | 340/3.7 |
| 5,905,882 A | 5/1999 | Sakagami et al. | 700/86 |
| 5,907,491 A | 5/1999 | Canada et al. | 364/468.15 |
| 5,909,183 A | 6/1999 | Borgstahl et al. | 340/825.22 |
| 5,915,207 A | 6/1999 | Dao et al. | 455/9 |
| 5,918,213 A | 6/1999 | Bernard et al. | 705/26 |
| 5,924,081 A | 7/1999 | Ostendorf et al. | 705/30 |
| 5,930,770 A | 7/1999 | Edgar | 705/28 |
| 5,930,771 A | 7/1999 | Stapp | 705/28 |
| 5,941,363 A | 8/1999 | Partyka et al. | 194/217 |
| 5,943,042 A | 8/1999 | Siio | 345/172 |
| 5,949,779 A | 9/1999 | Mostafa et al. | 370/389 |
| 5,950,630 A | 9/1999 | Portwood et al. | 128/897 |
| 5,956,487 A | 9/1999 | Venkatraman et al. | 709/218 |
| 5,957,262 A | 9/1999 | Molbak et al. | 194/200 |
| 5,959,536 A | 9/1999 | Chambers et al. | 710/104 |
| 5,959,869 A | 9/1999 | Miller et al. | 364/479.1 |
| 5,979,757 A | 11/1999 | Tracy et al. | 235/383 |
| 5,982,325 A | 11/1999 | Thornton et al. | 342/357.07 |
| 5,982,652 A | 11/1999 | Simonelli et al. | 363/142 |
| 5,986,219 A | 11/1999 | Carroll et al. | 177/1 |
| 5,991,749 A | 11/1999 | Morrill, Jr. | 705/44 |
| 5,997,170 A | 12/1999 | Brodbeck | 364/479.06 |
| 6,003,070 A | 12/1999 | Frantz | 709/206 |
| 6,005,850 A | 12/1999 | Moura et al. | 370/282 |
| 6,012,041 A | 1/2000 | Brewer et al. | 705/28 |
| 6,021,324 A | 2/2000 | Sizer, II et al. | 455/403 |
| 6,021,437 A | 2/2000 | Chen et al. | 709/224 |
| 6,029,143 A | 2/2000 | Mosher et al. | 705/28 |
| 6,032,202 A | 2/2000 | Lea et al. | 710/8 |
| 6,038,491 A | 3/2000 | McGarry et al. | 700/231 |
| 6,052,667 A | 4/2000 | Walker et al. | 705/15 |
| 6,052,750 A | 4/2000 | Lea | 710/72 |
| 6,056,194 A | 5/2000 | Kolls | 235/381 |
| 6,057,758 A | 5/2000 | Dempsey et al. | 340/539 |
| 6,061,668 A | 5/2000 | Sharrow | 705/400 |
| 6,068,305 A | 5/2000 | Myers et al. | 292/201 |
| 6,070,070 A | 5/2000 | Ladue | 455/419 |
| 6,072,521 A | 6/2000 | Harrison et al. | 348/12 |
| 6,084,528 A | 7/2000 | Beach et al. | 340/825.35 |
| 6,085,888 A | 7/2000 | Tedesco et al. | 194/217 |
| 6,108,700 A * | 8/2000 | Maccabee et al. | 709/224 |
| 6,109,524 A | 8/2000 | Kanoh et al. | 235/381 |
| 6,119,053 A | 9/2000 | Taylor et al. | 700/231 |
| 6,119,100 A | 9/2000 | Walker et al. | 705/20 |
| 6,124,800 A | 9/2000 | Beard et al. | 340/825.35 |
| 6,131,399 A | 10/2000 | Hall | 62/127 |
| 6,151,582 A | 11/2000 | Huang et al. | |
| 6,161,059 A | 12/2000 | Tedesco et al. | 700/232 |
| 6,163,811 A | 12/2000 | Porter | 709/247 |
| 6,181,981 B1 * | 1/2001 | Varga et al. | 700/236 |
| 6,185,545 B1 | 2/2001 | Resnick et al. | 705/40 |
| 6,199,753 B1 | 3/2001 | Tracy et al. | 235/375 |
| 6,230,150 B1 | 5/2001 | Walker et al. | 705/400 |
| 6,272,395 B1 | 8/2001 | Brodbeck | 700/236 |
| 6,289,453 B1 | 9/2001 | Walker et al. | 713/175 |
| 6,304,895 B1 | 10/2001 | Schneider et al. | 709/203 |
| 6,317,649 B1 | 11/2001 | Tedesco et al. | 700/232 |
| 6,324,520 B1 | 11/2001 | Walker et al. | 705/16 |
| 6,338,149 B1 | 1/2002 | Ciccone, Jr. et al. | 714/38 |
| 6,339,731 B1 * | 1/2002 | Morris et al. | 700/236 |
| 6,341,271 B1 | 1/2002 | Salvo et al. | 705/28 |
| 6,356,794 B1 | 3/2002 | Perin, Jr. et al. | 700/78 |
| 6,385,772 B1 | 5/2002 | Courtney | 725/105 |
| 6,397,247 B1 * | 5/2002 | Shirakawa et al. | 709/223 |
| 6,427,912 B1 | 8/2002 | Levasseur | 235/381 |
| 6,434,534 B1 | 8/2002 | Walker et al. | 705/14 |
| 6,437,692 B1 | 8/2002 | Petite et al. | 340/540 |
| 6,442,532 B1 | 8/2002 | Kawan | 705/35 |
| 6,446,123 B1 * | 9/2002 | Ballantine et al. | 709/224 |
| 6,457,038 B1 | 9/2002 | Defosse | 709/200 |
| 6,462,644 B1 * | 10/2002 | Howell et al. | 340/5.92 |
| 6,467,685 B1 | 10/2002 | Teicher | 235/379 |
| 6,502,131 B1 | 12/2002 | Vaid et al. | 709/224 |
| 6,505,095 B1 * | 1/2003 | Kolls | 700/244 |
| 6,525,644 B1 | 2/2003 | Stillwagon | 340/5.61 |
| 6,550,672 B1 | 4/2003 | Tracy et al. | 235/383 |
| 6,553,336 B1 | 4/2003 | Johnson et al. | 702/188 |
| 6,581,986 B2 | 6/2003 | Roatis et al. | 292/199 |
| 6,584,309 B1 | 6/2003 | Whigham | 455/414 |
| 6,585,622 B1 | 7/2003 | Shum et al. | 482/8 |
| 6,604,086 B1 | 8/2003 | Kolls | 705/14 |
| 6,604,087 B1 | 8/2003 | Kolls | 705/14 |
| 6,606,602 B1 | 8/2003 | Kolls | 705/14 |
| 6,609,113 B1 | 8/2003 | O'Leary et al. | 705/39 |
| 6,615,623 B1 | 9/2003 | Ormerod | 70/224 |
| 6,695,166 B2 | 2/2004 | Long | 221/14 |
| 6,704,714 B1 | 3/2004 | O'Leary et al. | 705/39 |
| 6,712,266 B2 | 3/2004 | Bartley et al. | 235/380 |
| 6,714,977 B1 | 3/2004 | Fowler et al. | 709/224 |
| 6,735,630 B1 | 5/2004 | Gelvin et al. | 709/224 |
| 6,738,811 B1 | 5/2004 | Liang | 709/224 |
| 6,748,296 B2 | 6/2004 | Banerjee et al. | 700/241 |
| 6,751,562 B1 | 6/2004 | Blackett et al. | 702/61 |
| 6,754,558 B2 * | 6/2004 | Preston et al. | 700/236 |
| 6,772,048 B1 | 8/2004 | Leibu et al. | 700/241 |
| 6,816,813 B2 * | 11/2004 | Tan et al. | 702/181 |
| 6,826,607 B1 | 11/2004 | Gelvin et al. | 709/224 |
| 6,832,251 B1 | 12/2004 | Gelvin et al. | 709/224 |
| 6,837,436 B2 | 1/2005 | Swartz et al. | 235/472.02 |
| 6,844,813 B2 | 1/2005 | Hardman | 340/539.1 |
| 6,850,252 B1 | 2/2005 | Hoffberg | 345/716 |
| 6,859,831 B1 | 2/2005 | Gelvin et al. | 709/224 |
| 6,867,685 B1 | 3/2005 | Stillwagon | 340/5.64 |
| 6,876,988 B2 | 4/2005 | Helsper et al. | 706/21 |
| 6,900,720 B2 | 5/2005 | Denison et al. | 340/5.9 |
| 6,901,347 B1 * | 5/2005 | Murray et al. | 702/182 |
| 6,925,335 B2 * | 8/2005 | May et al. | 700/9 |
| 6,934,673 B2 * | 8/2005 | Alvarez et al. | 703/21 |
| 6,959,265 B1 | 10/2005 | Candela et al. | 702/186 |
| 6,973,475 B2 | 12/2005 | Kenyon et al. | 709/203 |
| 6,996,502 B2 * | 2/2006 | De La Cruz et al. | 702/188 |
| 7,017,085 B2 | 3/2006 | Braun | 714/47 |
| 7,076,329 B1 | 7/2006 | Kolls | 700/232 |
| 7,131,575 B1 * | 11/2006 | Kolls | 235/379 |
| 7,894,938 B1 * | 2/2011 | Arora et al. | 700/241 |
| 2001/0002210 A1 | 5/2001 | Petite | 379/155 |
| 2001/0034566 A1 | 10/2001 | Offer | 700/236 |
| 2001/0042121 A1 * | 11/2001 | Defosse et al. | 709/224 |

| | | | |
|---|---|---|---|
| 2001/0047410 A1 | 11/2001 | Defosse | 709/224 |
| 2001/0054083 A1 | 12/2001 | Defosse | 709/217 |
| 2002/0016829 A1 | 2/2002 | Defosse | 709/217 |
| 2002/0024420 A1 | 2/2002 | Ayala et al. | 340/5.61 |
| 2002/0032470 A1 | 3/2002 | Linberg | 607/60 |
| 2002/0077724 A1 | 6/2002 | Paulucci et al. | 700/231 |
| 2002/0082665 A1 | 6/2002 | Haller et al. | 607/60 |
| 2002/0107610 A1 | 8/2002 | Kaehler et al. | 700/232 |
| 2002/0169539 A1 | 11/2002 | Menard et al. | 701/200 |
| 2002/0194387 A1 | 12/2002 | Defosse | 709/251 |
| 2003/0003865 A1 | 1/2003 | Defosse et al. | 455/41 |
| 2003/0013482 A1 | 1/2003 | Brankovic | 455/553 |
| 2003/0050841 A1 | 3/2003 | Preston et al. | 705/16 |
| 2003/0061094 A1 | 3/2003 | Banerjee et al. | 705/14 |
| 2003/0074106 A1* | 4/2003 | Butler | 700/236 |
| 2003/0088474 A1 | 5/2003 | Hoffman et al. | |
| 2003/0097474 A1 | 5/2003 | Defosse et al. | 709/246 |
| 2003/0101257 A1 | 5/2003 | Godwin | 709/223 |
| 2003/0101262 A1 | 5/2003 | Godwin | 709/224 |
| 2003/0128101 A1 | 7/2003 | Long | 340/5.26 |
| 2003/0204391 A1 | 10/2003 | May et al. | 704/8 |
| 2004/0133653 A1 | 7/2004 | Defosse et al. | |
| 2004/0207509 A1 | 10/2004 | Mlynarczyk et al. | 340/5.23 |
| 2005/0043011 A1 | 2/2005 | Murray et al. | |
| 2005/0131577 A1 | 6/2005 | Ota et al. | 700/242 |
| 2005/0161953 A1 | 7/2005 | Roatis et al. | 292/199 |
| 2005/0179544 A1 | 8/2005 | Sutton et al. | 340/543 |
| 2006/0106490 A1* | 5/2006 | Howell et al. | 700/233 |
| 2006/0195567 A1* | 8/2006 | Mody et al. | 709/224 |
| 2006/0219777 A1* | 10/2006 | Arora et al. | 235/381 |
| 2007/0096867 A1 | 5/2007 | Denison et al. | 340/5.23 |
| 2007/0100696 A1* | 5/2007 | Illingworth | 705/14 |
| 2008/0140515 A1 | 6/2008 | Godwin | |
| 2009/0094081 A1* | 4/2009 | Wittern et al. | 705/7 |
| 2009/0112672 A1* | 4/2009 | Fl mig et al. | 705/8 |
| 2010/0312611 A1* | 12/2010 | Henderson et al. | 705/10 |

FOREIGN PATENT DOCUMENTS

| | | |
|---|---|---|
| EP | 0 602 787 A2 | 10/1993 |
| EP | 0 817 138 A1 | 1/1998 |
| EP | 0 999 529 | 5/2000 |
| EP | 1096408 | 5/2001 |
| FR | 2 744 545 | 2/1996 |
| FR | 2 755776 | 5/1998 |
| JP | 04253294 | 9/1992 |
| JP | 6296335 A2 | 10/1994 |
| JP | 9198172 A2 | 7/1997 |
| JP | 10105802 | 4/1998 |
| WO | WO 89/07807 | 8/1989 |
| WO | WO 95/04333 | 2/1995 |
| WO | WO 95/05609 | 2/1995 |
| WO | WO 97/09667 | 3/1997 |
| WO | WO 98/45779 | 10/1998 |
| WO | WO 99/23620 | 5/1999 |
| WO | WO 99/27465 | 6/1999 |
| WO | WO 99/36751 | 7/1999 |
| WO | WO 99/48065 | 9/1999 |
| WO | WO 00/04475 | 1/2000 |
| WO | WO 00/04476 | 1/2000 |
| WO | WO 00/31701 | 6/2000 |
| WO | WO 02/19281 | 3/2002 |

OTHER PUBLICATIONS

Wireless Communications Forum; vol. III, No. 1 pp. 25-30, Apr. 1995.
Left high and dry? Sold-out machine sends for Cokes; Nashville Banner, Aug. 16, 1995.
Leitch, Carolyn, "Coke machines signal when it's time for a refill"; The Globe & Mail, Toronto, Ontario, Aug. 30, 1995.
Meet the Smart Coke Machine; The Sacramento Bee Business Technology; Wednesday, Aug. 30, 1995.
Skywire allows vendor tracking of pop stock and sales details; RCR, vol. 14, No. 17, Sep. 4, 1995.
International Search Report for PCT/US99/05983 7 pages, Aug. 13, 1999.
American Power Conversion Internet Article, "Lightning Advisor", at internet ,<http://lightning.apcc.com>, May 10, 2000.
American Products Internet Article, "Product Information", at internet, <http://www.apc.com>, May 10, 2000.
NetBotz Internet Article, "Welcome to Netbotz" at internet <http:www.netbotz.com>, May 10, 2000.
*BT redcare Telemetry Vending Interface Unit (VIU)*, Antronics Ltd Case Study, <http:www.antronic.co.uk/portfolio/viu>, 4 pgs, 2001.
International Search Report PCT/US01/16749, Dec. 20, 2001.
International Search Report PCT/US01/15522, May 16, 2002.
International Search Report PCT US 01/41640, Aug. 21, 2002.
International Search Report PCT/US 01/31381, Nov. 7, 2002.
International Preliminary Examination Report PCT/US01/31381 (3 pages), May 12, 2003.
NAMA White Paper: Cashless Vending, The National Automatic Merchandising Association (34 pages), 2004.
International Search Report PCT/US 03/37776, May 17, 2004.
What is an iButton?, Maxim/Dallas, http://www.maxim-ic.com/products/ibutton/ibuttons/, 3 pages, Dec. 29, 2005.
Office Action dated Apr. 1, 2010 in connection with U.S. Appl. No. 12/035,074.
Office Action dated Nov. 15, 2010 in connection with U.S. Appl. No. 11/299,607.
Office Action dated Mar. 29, 2013 in connection with U.S. Appl. No. 12/035,074, filed Feb. 21, 2008.
Extended European Search Report dated Nov. 29, 2012 in connection with European Patent Application No. 09712876.3, 6 pages.

* cited by examiner

| | SUN | MON | TUE | WED | THU | FRI | SAT |
|---|---|---|---|---|---|---|---|
| ALL ITEMS IN STOCK | | ▨▨ | ▨▨ | ▨ | | ▨▨ | ▨▨▨ | ▨▨▨ |
| BILL VALIDATOR OPERATIONAL | ▨▨▨ | ▨▨▨ | ▨ | | ▨▨ | ▨▨▨ | ▨▨▨ |
| COIN MECHANISM OPERATIONAL | ▨▨▨ | ▨▨▨ | ▨▨▨ | ▨▨ | | ▨▨ | ▨▨▨ |
| CARD READER OPERATIONAL | ▨▨▨ | ▨▨▨ | ▨▨▨ | ▨▨▨ | ▨▨▨ | ▨▨▨ | ▨▨▨ |
| NOT IN EXACT CHANGE MODE | ▨▨▨ | ▨▨▨ | ▨▨▨ | ▨▨▨ | ▨▨ | | |
| PERIODS OF FULL OPERATIONAL EFFICIENCY | | ▨▨ | ▨ | ▨▨ | | | |
| OVERALL OPERATIONAL EFFICIENCY = 35.76 | | | | | | | |

SYSTEMS AND METHODS FOR MONITORING PERFORMANCE OF FIELD ASSETS

RELATED APPLICATIONS

This application related to co-pending U.S. patent application Ser. No. 11/464,127 filed Aug. 11, 2006, and hereby incorporated by reference, which is a Continuation-In-Part of U.S. patent application Ser. No. 10/722,954, filed Nov. 26, 2003 (now U.S. Pat. No. 7,167,892), which claims the benefit of U.S. Provisional Application No. 60/429,756, filed Nov. 27, 2002 and U.S. Provisional Application No. 60/480,626, filed Jun. 23, 2003, and which is a Continuation-In-Part of U.S. patent application Ser. No. 09/971,170, filed Oct. 4, 2001 (now U.S. Pat. No. 7,181,501), which is a Continuation-in-Part of U.S. patent application Ser. No. 09/267,254, filed Mar. 12, 1999 (now U.S. Pat. No. 6,457,038), which claims the benefit of U.S. Provisional Application No. 60/078,645, filed Mar. 19, 1998 and U.S. Provisional Application No. 60/099,434, filed Sep. 8, 1998.

TECHNICAL FIELD

The present invention relates in general to the field of monitoring remote field assets and, more particularly, the monitoring of the performance of field assets.

BACKGROUND OF THE INVENTION

Machine to machine (M2M) technology refers generally to the ability of machines, devices, and assets, particularly those that are distributed or remote, to exchange information with people and/or with a corporate management system. Although a precise definition of M2M is difficult to formulate, M2M generally encompasses the use of telemetry via networks including, but not limited to, public wireless networks.

Historically, telemetry systems were limited to applications for conglomerates and other well financed organizations. Large oil and gas companies and electric utilities, through the use of extensive customer built dedicated data networks, were among the first private organizations to use telemetry widely. More recently, however, the cost of access to public wireless data networks has been dropping while the capabilities of these networks has been increasing thus making M2M concepts feasible for a much larger audience.

The M2M systems described herein generally include remotely located machines or devices referred to as field assets. Although field assets may encompass any variety of specific types of machines (oil rigs, cellular phone system base stations, ATM machines, and weather monitors), the specific embodiments described herein are in the field of vending machines. Vending machines are unmanned, electro-mechanical devices that dispense products including consumable products such as soft drinks and snack foods in exchange for cash or other form of payment. Vending machines are generally deployed as remotely located field assets by a company that manages a plurality of such devices.

In the field of vending machines, the traditional extent of automation consisted primarily of the ability retrieve "snap-shots" of inventory data from a vending machine using a wired, hand held device and a specialized, industry standard, data exchange (DEX) protocol and interconnect. DEX is a communication protocol (DEX) for the electronic retrieval of machine-level transactions via data polling. While DEX has served its purpose well for a considerable period of time, DEX is not capable of analyzing vending machine sales beyond the most superficial level. Nor is DEX capable of providing information that could be used to manage a vending machine from a maintenance perspective. Moreover, a DEX polling event effectively takes a vending machine off line, even if for only a short duration. This limitation prevents it from serving as a real time transaction monitoring protocol.

More recently, the Multi Drop Bus/Internal Communication Protocol (MDB/ICP or, more simply MDB) vending machine technology has evolved. MDB defines a bus interface and standard for electronically controlled vending machines. Unlike DEX, MDB provides a control mechanism and standard for the various peripheral devices typically encountered in a vending machine. Moreover, MDB supports a level of time stamping that enables insight into information that is potentially valuable to a vending machine company. Despite the opportunities for expanded functionality and data insight offered by MDB, conventional MDB-compliant vending machines tend to utilize MDB merely as an interconnect between a VMC and one or more peripherals and, possibly, a source of DC power.

Nevertheless, some efforts have been devoted to adding functionality to conventional vending machines. For example, U.S. Pat. No. 7,167,892, referred to above, describes a processor-based audit device having access to the MDB bus and to the VMC via a DEX port. Using this audit device, a vending machine can greatly improve the amount and quality of information concerning sales. If, for example, sales of a particular vending machine vary considerably from day to day and even within a day, conventional DEX polling, which might take place on a weekly basis, for example, will not be able to identify these variations and the inability to do so could result in lost sales opportunities.

Using such an audit device, a vending machine can retrieve and store a plurality of DEX downloads together with information from which time stamps can be derived for each DEX download. While the ability to place DEX data in a timing context represents an advance a vending machine management, it would be still further desirable to continue to extend the functionality of vending machines to encompass information that is outside the scope of DEX or to capture and enhance traditional DEX data without performing a DEX download.

As another example, U.S. patent application Ser. No. 11/464,127, referred to above, describes a packet capture agent (also referred to therein as a snoop agent or an MDB Offload Engine (MOE)) to capture MDB packets. Capturing packets directly from the MDB serves a variety of purposes including, as examples, enabling feedback of field asset performance and customer behavior in real time, without requiring a DEX polling event, uncoupling field asset monitoring from the DEX standard, and facilitating the gathering of quantifiable, time-based consumer behavior data.

SUMMARY OF THE INVENTION

In accordance with the teachings of the present disclosure, disadvantages and problems associated with the monitoring of field assets may be substantially reduced or eliminated.

In accordance with one embodiment of the present disclosure, a method for monitoring the performance of a field asset is provided. Packets transmitted on a shared bus located in a field asset may be captured. The captured packets may be analyzed to determine one or more operational parameters associated with one or more peripheral devices coupled to the shared bus. The one or more operational parameters may be analyzed to determine an operational efficiency of the field asset.

In accordance with another embodiment of the present disclosure, a field asset may include a machine controller configured to function as a master of a shared bus, one or more peripheral devices communicatively coupled to the bus, a snoop agent, and an audit agent. The machine controller may transmit packets to the peripheral devices via the shared bus. The snoop agent may be configured to capture packets transmitted on the shared bus. The audit agent may be configured to analyze the captured packets to determine one or more operational parameters associated with the one or more peripheral devices and analyze the one or more operational parameters to determine an operational efficiency of the field asset.

In accordance with a further embodiment of the present disclosure, system for monitoring the performance of a field asset may include a field asset. The field asset may include a machine controller configured to function as a master of a shared bus, one or more peripheral devices communicatively coupled to the bus, a snoop agent, and an audit module. The machine controller may transmit packets to the peripheral devices via the shared bus. The snoop agent may be configured to capture packets transmitted on the shared bus. The audit agent may be configured to analyze the captured packets to determine one or more operational parameters associated with the one or more peripheral devices and analyze the one or more operational parameters to determine an operational efficiency of the field asset.

Other technical advantages will be apparent to those of ordinary skill in the art in view of the following specification, claims, and drawings.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to FIGS. 1 through 4, wherein like numerals indicate like and corresponding parts of the invention. Where different instances of a particular element are shown, they may be numbered with hyphenated reference numerals to indicate a common design or functionality. For example, elements 102-1 and 102-2 may be instances of a generic 102 element.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10 baseT, 100 baseT, etc.), coaxial cables, T-1 lines, T-3 lines, ISDN lines, ADSL, etc.

The term "wireless transmissions" may be used to refer to all types of electromagnetic communications which do not require a wire, cable, or other types of conduits. Examples of wireless transmissions which may be used include, but are not limited to, personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, for example IEEE 802.11 and BLUETOOTH, as well as infrared, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

The term "data processing system" may be used to refer to any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an data processing system may be a personal computer, a PDA, a consumer electronic device, a network storage device, or any other suitable device and may vary in size, shape, performance, functionality, and price. A data processing system may include memory, one or more processing resources such as a central processing unit (CPU) or hardware or software control logic. Additional components of a data processing system may include one or more storage devices, one or more communications ports for communicating with external devices as well as various input and output (I/O) devices, such as a keyboard, a mouse, and a video display. A data processing system may also include one or more buses operable to transmit communication between the various hardware components.

The term "computer-readable media" may be used to refer to any instrumentality or aggregation of instrumentalities that may retain data and/or instructions for a period of time. Computer-readable media may include, without limitation, random access memory (RAM), read-only memory (ROM), electrically erasable programmable read-only memory (EEPROM), a PCMCIA card, flash memory, direct access storage (e.g., a hard disk drive or floppy disk), sequential access storage (e.g., a tape disk drive), compact disk, CD-ROM, DVD, and/or any suitable selection of volatile and/or non-volatile memory and/or storage.

Figure 1:
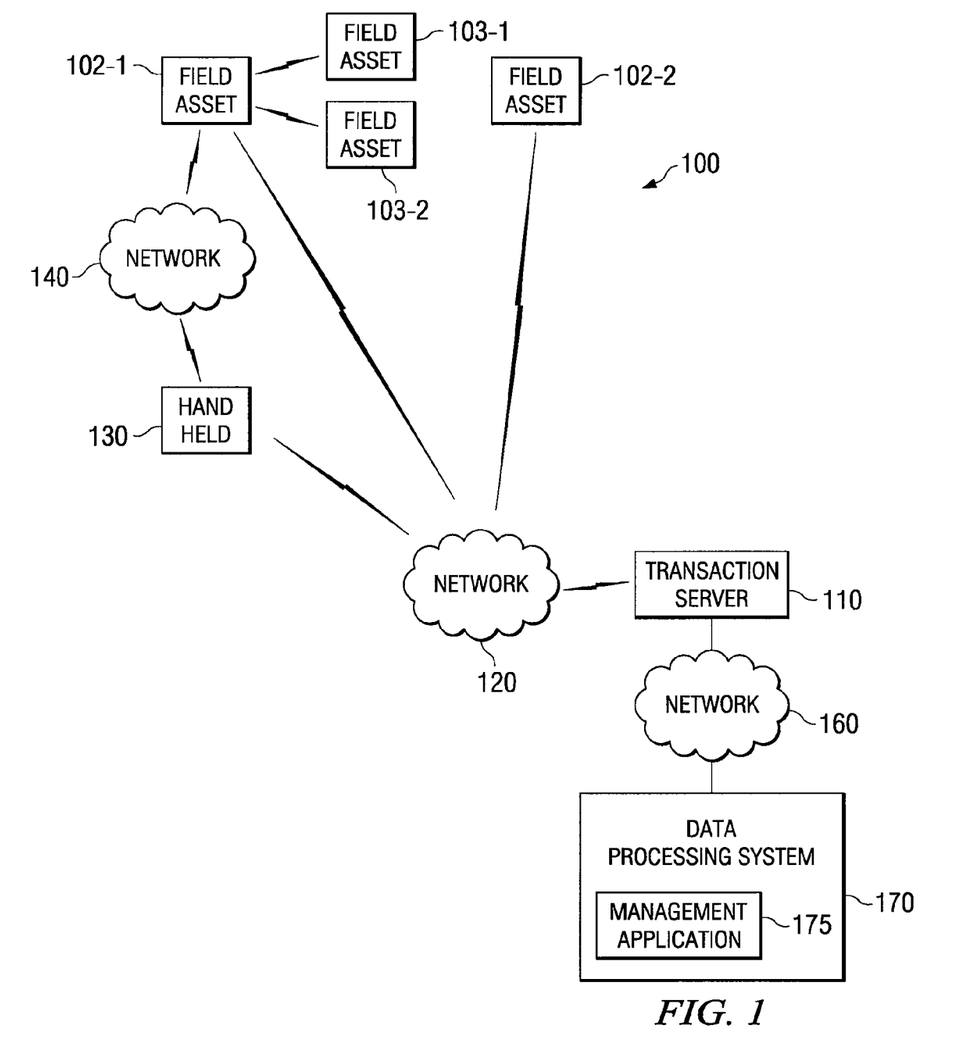
FIG. 1 depicts a block diagram of an example system for monitoring the performance of field assets, in accordance with the present disclosure.

FIG. 1 depicts a block diagram of an example system 100 for monitoring the performance of field assets, in accordance with the present disclosure. System 100 may include one or more field assets, examples of which are depicted as field assets 102-1 and 102-2 (generically or collectively referred to herein as field asset(s) 102) and field assets 103-1 and 103-2.

Field assets 102 are depicted in FIG. 1 as being operable to communicate with a transaction server 110. Field assets 102 may be any set of machines or devices, typically having similar functionality, that are remotely distributed and capable of engaging in some form of transaction. Examples of field assets include oil rigs, cellular phone system base stations, ATM machines, and weather monitors.

In some embodiments, field assets 102 and 103 may comprise one or more vending machines in which transactions likely include the sale of consumer goods stocked in the vending machine. Vending machines are ubiquitous machines historically used as an unmanned source of perishable and nonperishable consumer products including canned and bottled drink products, snack foods, and so forth.

In the embodiment depicted in FIG. 1, field assets 102 and 103 may communicate with transaction server 110 via alternative communication paths. For example, field asset 102-2 may couple to transaction server 110 via network 120. As depicted in FIG. 1, network 120 may be a wireless network and field asset 102-2 may communicate to transaction server 110 via wireless transmissions.

Field asset 102-1 is depicted as being capable of communicating with a hand held device 130 via a network 140 or "directly" with transaction processing server 110 via network 120. As depicted in FIG. 1, network 140 may be a wireless network and field asset 102-2 may communicate to hand held device 130 via wireless transmissions, which in turn may communicate to transaction server via network 120. Also as depicted in FIG. 1, field assets 103 may communicate locally with field asset 102-1 and use field asset 102-1 to act as a relay station for information from devices 103-1 and 103-2.

Transaction server 110 may be implemented as a set of one or more server class computers operable to process many transactions. Transaction server 110 may include, as an example, a database management application (e.g., Oracle, DB2, etc.)

A data processing system 170 is depicted in FIG. 1 as being coupled to transaction server 110 via network 160. Data processing system 170 may include a processor, memory, and I/O peripherals according to any of various well-known data processing system designs. Data processing system 170 may include an operating system (OS) and a management application 175. Management application 175 may be any program of instructions embodied in computer-readable media operable to facilitate transmission, receipt, and/or display of data communicated via network 160. In certain embodiments, management application 175 may comprise a simple network management protocol (SNMP) application. In other embodiments, management application 175 may comprise a conventional web browsing application.

Each of network 120, 140 and 160, may be any network and/or fabric configured to couple one or more field assets 102 and/or 103, hand held devices 130, transaction servers 110, and/or computing devices (e.g., computer 170) in accordance with the present disclosure. Each of network 120, 140 and 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data), or any combination thereof. Each of network 120, 140 and 160 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Each of network 120, 140 and 160 and their various respective components may be implemented using hardware, software, or any combination thereof.

In certain embodiments of system 100, network 120 may be implemented as a wireless network using any of a variety of long-range wireless transmission technologies, e.g., cellular technology. Such embodiments may include the well-known use of multiple base stations positioned in specified locations to communicate wireless signals across a wide geographic area. Similarly, in certain embodiments of system 100, network 160 may be implemented as (or part of) the Internet and/or an intranet.

In certain embodiments of system 100, network 140 may be implemented as a wireless network using any of a variety of short range wireless transmission technologies including, without limitation, Bluetooth and WiFi (e.g., IEEE 802.11b, IEEE 802.11g, and their derivatives). In such embodiments, an operator may convey hand held device 130 to a location that is in close proximity to a field asset 102. Field asset 102 and hand held device 130 may establish a local wireless signal enabling communication between the two. After establishing a local wireless communication channel, field asset 102 and hand held device 130 may exchange data or information. Field asset 102 may, as an example, transmit sales transaction information to hand held device 130. Hand held device 130 may then convey the information it has received from field asset 102 to transaction server 110 via network 120. Alternatively, transfer of information from field asset 102-1 to transaction server 110 could be achieved by transferring the data from field asset 102-1 to hand held device 130 using network 140, transporting hand held device 130 to a location in proximity to transaction server 110, and transmitting the information in hand held device 130 to interaction server 110 via transfer (e.g., a wireless or wireline transfer). As another alternative, information may be passed from field asset 102-1 to hand held device 130 and/or from hand held device 130 to transaction server 110 using wireline transmissions, e.g., a cable or other wired connection, possibly to enhance the security of confidential information.

The type of information conveyed or otherwise exchanged between field assets 102 and interaction server 110 varies depending upon the manner in which and the purpose for which field asset 102 is implemented, but the information most likely includes information about transactions that occur or have occurred using field assets 102. In embodiments where field assets 102 and 103 include a vending machine, the transaction information referred to may include, as examples, information about when a transaction occurs and other transaction details, for example, what product or combination of products were purchased, what consumer or customer purchased the product (if known, e.g., by reading a name from a magnetic strip of a credit card), the dollar amount of the purchase, the amount of time required to complete the purchase, the manner of payment, the operational status of vending machine components (e.g., correct change events, compressor failure, bill validator failure, coin mechanism failure, card reader failure, mechanical jams, etc.), and other information that may be useful to vending machine operators and/or the providers of goods sold through field assets 102.

As depicted in FIG. 1, system 100 may include various components that facilitate high volume transaction processing in a remotely distributed architecture that includes wireless communication elements, which may be characterized by relatively unreliable or unstable communication paths to all or some of the remote assets. For example, as described above, the elements of system 100 may include (1) remote communication facilities to communicate with remote assets over multiple forms of wireless networks, (2) hand held technology suitable for mobile access to the field assets and to a transaction server, (3) server software for processing volumes of transactions, and (4) browser based access to useful information provided by transaction server 110.

Figure 2:
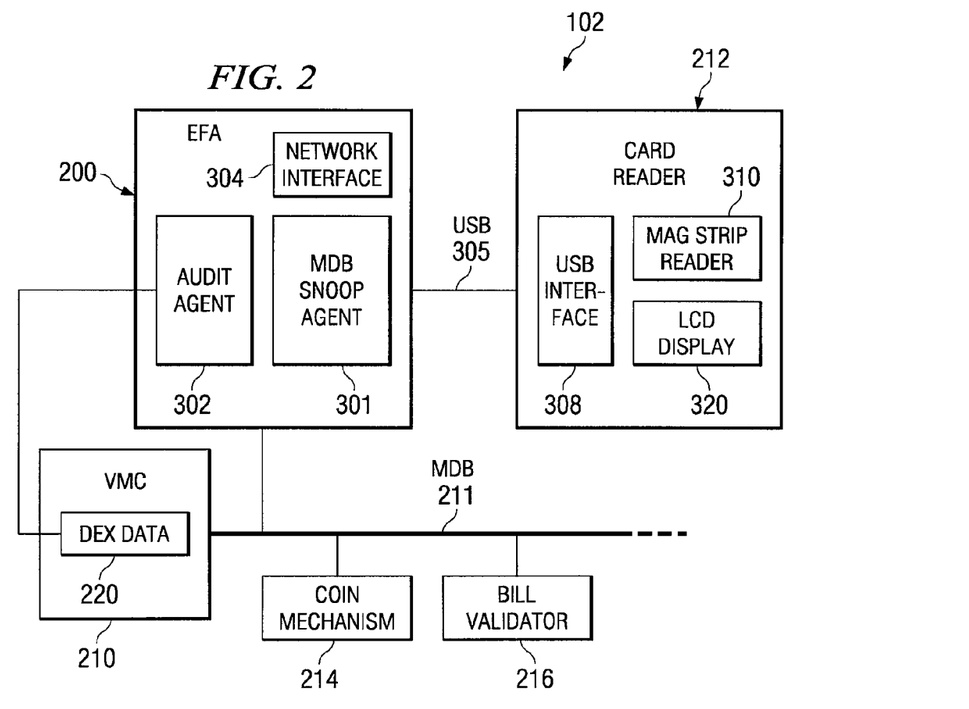
FIG. 2 depicts a block diagram of an example field asset of FIG. 1, in accordance with the present disclosure.

As described in greater detail with respect to FIG. 2, one or more of field assets 102 and 103 may be an MDB-compliant vending machine that includes a vending machine controller (VMC) as the master of an industry standard MDB bus to which one or more peripheral devices are connected. In addition to conventional peripheral devices such as bill validators and coin mechanisms, a field asset may include an extended function adapter ("EFA"). An EFA may include expandable, PC industry standard communication interface to legacy equipment and may include hardware, firmware, and/or software that implements a platform for providing value added functionality to the vending machine or other field asset. For example, an EFA may provide a platform for interfacing to archaic or otherwise unique protocols such as Data Exchange (DEX) and Multi-Drop Bus (MDB) commonly encountered in remote field asset applications and especially in the vending machine industry.

As described in greater detail with respect to FIG. 2, the EFA may support one or more beneficial capabilities that facilitate automated vending machine management. An area of EFA functionality of special interest is an MDB snoop agent to capture and buffer or otherwise store packets on the MDB. In some embodiments, the EFA integrates two or more distinct extended function features. The EFA may, for example, include a audit agent that includes the capacity to perform DEX polling and to store and time stamp the captured DEX data structures.

FIG. 2 depicts a block diagram of an example field asset 102 of FIG. 1, in accordance with the present disclosure. While the elements of FIG. 2 are applicable to field assets 103 of FIG. 1, the remainder of the discussion will use reference numeral 102 exclusively for the sake of simplicity. As depcited in FIG. 2, field asset 102 may include an MDB-compliant machine or device, and may include a VMC 210 connected to an MDB 211, to which a plurality of peripheral devices may be connected.

Figure 3:
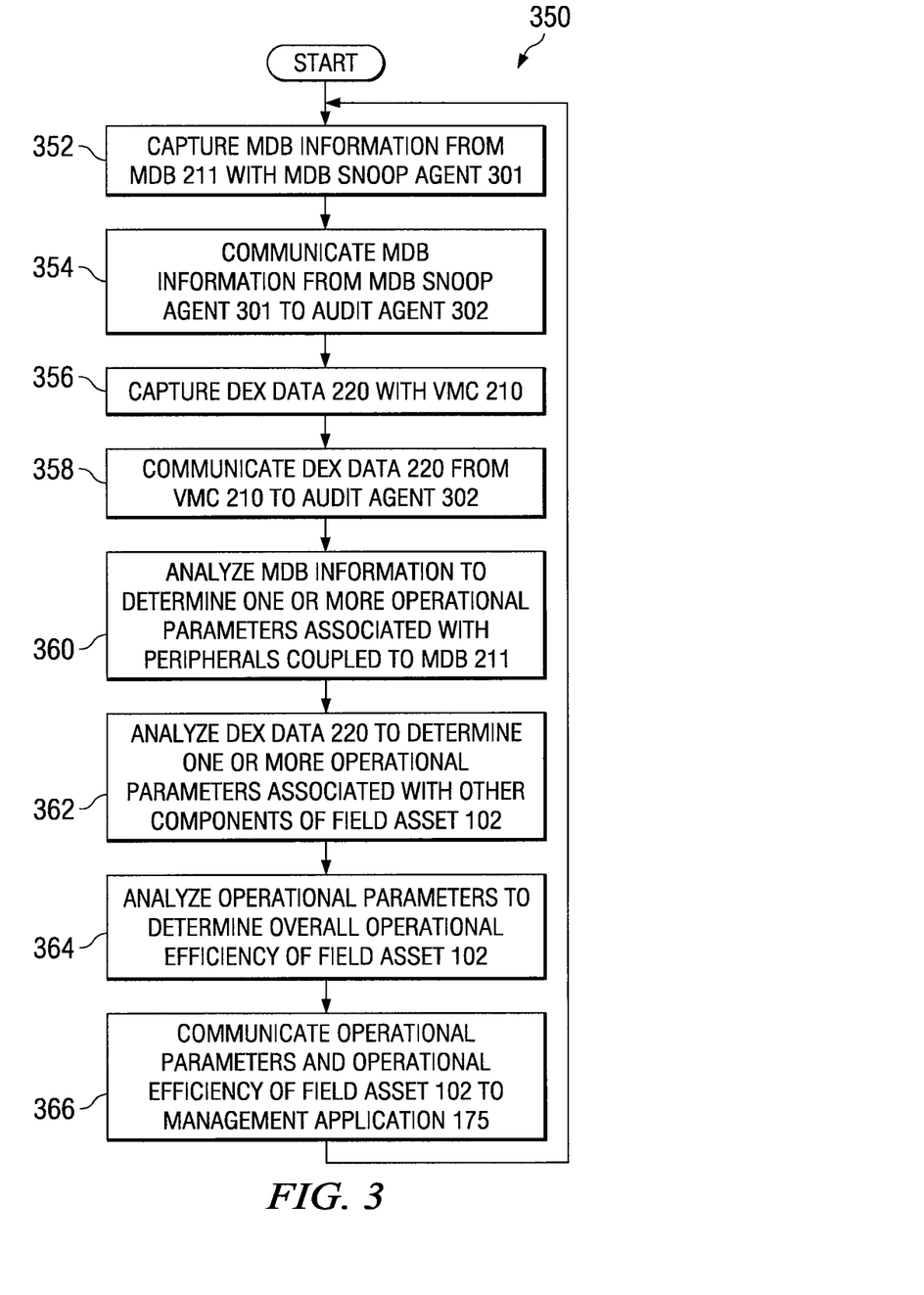
FIG. 3 depicts a flow chart of an example method for monitoring the performance of field assets, in accordance with the present disclosure.

As shown in FIG. 2, field asset 102 may comprise peripheral devices including a coin mechanism 214, a bill validator 216, and a card reader 212. These peripheral devices are well-known devices in the field of vending machines generally and MDB-compliant vending machines in particular. Although FIG. 2 depicts field asset 102 as including coin mechanism 214, a bill validator 216, and a card reader 212, it is understood that any number and/or any type of other peripheral devices may be included in field asset 102. As depicted in FIG. 3, coin mechanism 214 and bill validator 216 may couple directly to MDB 211 while card reader 212 may couple to MDB 211 using extended function adapter (EFA) 200 as an intermediary. Card reader 212 may couple to EFA 200 via a universal serial bus (USB) connection 305. Card reader 212 may include any system, device or apparatus operable to read a credit card and/or other cashless payment medium, and may include a magnetic strip reader 310, a liquid crystal display (LCD) display 320, and a USB Interface 308, providing access to USB connection 308.

MDB 211 may be compliant with the Multi-Drop Bus/Internal Communication Protocol (the MDB protocol) maintained by the National Automatic Marketing Association (NAMA). The MDB protocol is an interface standard that allows the various components of a vending machine to communicate to the VMC. The MDB protocol determines the way in which the VMC learns what coins are accepted by coin mechanism 214, what bills are accepted by bill validator 216, and how much credit is available through card reader 212. It is a way for the VMC to communicate to coin mechanism 214 how much change to pay out or to communicate to card reader 212 how much credit to return to a swiped credit card and/or other cashless payment medium.

Unlike many shared bus protocols, the MDB protocol may define VMC 210 as the one and only master of the MDB and all other peripherals as slaves. VMC 210 may address packets to any of the peripheral devices, but peripheral devices cannot communicate with each other and only transmit packets to VMC 210 in response to receiving a packet from VMC 210. Also, as suggested previously, MDB is a polling-based protocol. A significant percentage of MDB traffic may consist of polling packets issued by VMC 210 and acknowledge packets from the peripheral devices. In most shared bus architectures, e.g., Ethernet and PCI, devices can act as masters or slaves and polling is not an inherent feature of the architecture.

EFA 200, as its name suggests, includes application extensions that enhance the features of field asset 102. In conjunction with VMC 210, EFA 200 may include an audit agent 302 suitable for retrieving DEX data 220 from VMC 210. In addition, EFA 200 may include an MDB snoop agent 301 enabled to capture and buffer or otherwise store MDB packets.

The ability to capture MDB packets enables a variety of different applications. MDB packet traffic may be captured and analyzed to achieve time-based and DEX-independent auditing capabilities. As another example, MDB packet traffic may also be used to monitor system health. Moreover, by combining MDB packet capture capabilities in conjunction with EFA 200 as described below, field asset 102 may facilitate the collection and analysis of data communicated within field asset 102. When further implemented in conjunction with networking and communication capabilities, field asset 102 may represent a highly intelligent component of an automated network of field assets.

EFA 200, as depicted in FIG. 2, may include an MDB snoop agent 301, an audit agent 302, and a network interface 304. Audit agent 302 may interact with VMC 210, e.g., through a conventional RS-232 link, to retrieve or poll DEX data 220 from VMC 210. EFA 200 may be programmed to poll DEX data 220 multiple times each day and to store the data for each such polling event and the time associated with each event. In this manner, audit agent 302 may create a dynamic view of DEX data. Audit agent 302 may also audit other aspects of field asset 102 including, for example, information captured by MDB snoop agent 301. Audit agent 302 may also communicate data to network interface 304. Network interface 304 may include any system, device or apparatus operable to communicate data to and receive data from network 120 and/or network 140 in accordance with the present disclosure. Accordingly, network interface 304 may turn communicate data to transaction server 110 via network 120 and/or network 140 for analysis by management application 175 of data processing system 170.

As described in greater detail in U.S. patent application Ser. No. 11/464,127, referenced above, MDB snoop agent 301 may include hardware, software, and/or firmware support to capture MDB packets as they appear on MDB 211 and provide them to an audit engine or application for further study (e.g., at audit agent 302, transaction server 110, and/or data processing system 170) and may be implemented, at least in part, as a daughter board that attaches to EFA 200 and may also include a microcontroller and other circuitry required to implement packet capture in an MDB environment.

FIG. 3 depicts a flow chart of an example method 350 for monitoring the performance of field assets 102 and 103, in accordance with the present disclosure. In one embodiment, method 350 includes capturing data relating to operational parameters of various components of field asset 102, and analyzing the operational parameters to determine the operational efficiency of field asset 102.

According to one embodiment, method 350 preferably begins at step 352. As noted above, teachings of the present disclosure may be implemented in a variety of configurations of system 100. As such, the preferred initialization point for method 350 and the order of the steps 352-366 comprising method 350 may depend on the implementation chosen.

At step 352, MDB snoop agent 301 may capture MDB information from MDB 211. The captured MDB information may include packets of data communicated between VMC 210 and peripherals coupled to MDB 211, such as card reader 212, coin mechanism 214, and bill validator 216, for example. In certain embodiments, some or all of the information captured by MDB snoop agent 301 may be indicative of an operational state of peripherals coupled to MDB 211. For example, a portion of the captured MDB information may indicate whether each of card reader 212, coin mechanism 214, and bill validator 216 are fully operational, or whether any of such peripherals has failed. At step 354 the captured MDB information may be communicated from MDB snoop agent 301 to audit agent 302.

At step 356, VMC 210 may capture DEX data 220. The captured DEX information may include data indicative of an operational state of components of field asset 102 not coupled to MDB 211. For example, a portion of captured DEX data 220 may indicate whether inventory items of field asset 102 are in stock, whether or not field asset 102 is operating in an exact change mode (e.g., if field asset 102 is depleted of sufficient coins of particular denominations, field asset 102 may not be able to give change for certain purchases), whether a vending mechanism of field asset 102 is jammed or obstructed, whether a compressor operating to chill inventory is operation, as well as any other parameters. At step 358, the captured DEX data 220 may be communicated from VMC 210 to audit agent 302.

Figure 4:
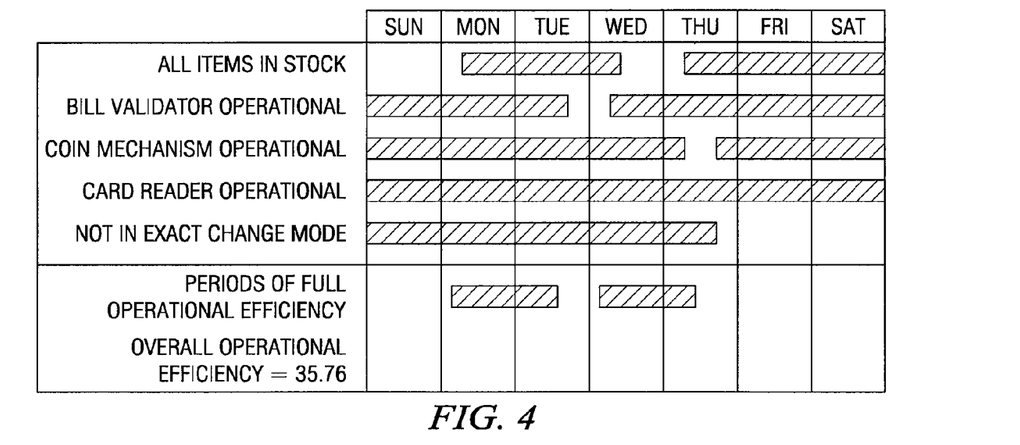
FIG. 4 depicts a table depicting certain operational parameters of various components of a field asset and the operational efficiency of the field asset.

At step 360, audit agent 302 may analyze captured MDB information to determine one or more operational parameters associated with peripherals coupled to MDB 211. For example, audit agent 302 may analyze the captured MDB information to determine periods of time in which each of card reader 212, coin mechanism 214, and bill validator 216 are fully operational, as depicted in FIG. 4. As noted above, FIG. 4 depicts a table depicting certain operational parameters of various components of field asset 102. As depicted in FIG. 4, audit agent 302 may analyze captured MDB information to determine, for example, that in a given week, bill validator 216 was fully operational from the beginning of the day Sunday through early evening Tuesday, and then again from Wednesday morning through the end of day Saturday. Likewise, audit agent 302 may analyze captured MDB information to also determine, for example, that in a given week, coin mechanism 214 was fully operational from the beginning of the day Sunday through early morning Thursday, and then again from Thursday night through the end of day Saturday, as also shown in FIG. 4. Similarly, audit agent 302 may analyze captured MDB information to further determine, for example, that in a given week, card reader 212 was fully operational during the entire week, as also shown in FIG. 4.

At step 362, audit agent 302 may analyze captured DEX data 220 to determine one or more operational parameters associated with other components of field asset 102. For example, audit agent 302 may analyze captured DEX data 220 to determine periods of time in which all inventory items of field asset 102 were in stock. To illustrate, audit agent 302 may analyze captured DEX data 220 to determine that in a given week, all items were in stock from Monday morning through Wednesday morning, and again from Thursday morning through Saturday evening, as shown in FIG. 4. Likewise, audit agent 302 may analyze captured DEX data 220 to also determine, for example, that in a given week, field asset 102 was not in exact change mode from beginning of the day Sunday through late Thursday night, as shown in FIG. 4.

At step 364, audit agent 302 may analyze the various operational parameters to determine the overall operational efficiency of field asset 102. For example, referring again to FIG. 4, audit agent 302 may analyze the previously discussed operational parameters (e.g., periods of all items in stock, operational status of card reader 212, operational status of coin mechanism 214, operational status of bill validator 216, and periods of not in exact change mode) to determine an overall operational efficiency of field asset 102. In the embodiment depicted in FIG. 4, the audit agent 302 may analyze the various operational parameters to determine the periods of full operational efficiency of field asset 102 (e.g., periods in which all individual operational parameters of field asset 102 are as desired). For example, as depicted in FIG. 4, the periods of full operational efficiency (Monday morning to Tuesday evening, and Wednesday morning to Thursday morning) may correspond to those time periods in which all items were in stock, card reader 212, coin mechanism 214 and bill validator 216 were all operational, and field asset 102 was not in exact change mode. Based on the determination of periods of full operational efficiency, audit agent 302 may calculate, for example as in the scenario depicted in FIG. 4, that field asset 102 has an operational efficiency of 35.7%, meaning that field asset 102 was fully operational during 35.7% of the week monitored.

At step 366, field asset 102 may communicate, via one more of networks 120, 140, and 160, the operational parameters, periods of full operational efficiency, overall operational efficiency and/or other data to management application 175, where such data can be reviewed and/or further analyzed by management application 175 and or a person using data processing system 170. For example, in one embodiment, all of a portion of FIG. 4 may be displayed on a display device of data processing system 170. After completion of step 366, method 350 may proceed again to step 352, where steps 352-366 may be repeated.

Although FIG. 3 discloses a particular number of steps to be taken with respect to method 350, it is understood that method 350 may be executed with greater or fewer steps than those depicted in FIG. 3. In addition, although FIG. 3 discloses a certain order of steps to be taken with respect to method 350, the steps comprising method 350 may be completed in any suitable order. For example, in certain embodiments, steps 356 and 358 may occur before or in parallel with steps 352 and 354. As another example, although steps 352 and 356 discuss the capture of data as a discrete step of method 350, it is understood that MDB information and DEX data 220 may be captured continuously over time and/or at regular intervals.

Method 350 may be implemented using system 100 or any other system operable to implement method 350. In certain embodiments, method 350 may be implemented partially or fully in software embodied in tangible computer readable media.

Although audit agent 302 is described above as analyzing MDB information and DEX data 220 to determine one or more operational parameters associated with peripherals and other components of field asset 102, and also described above as analyzing operational parameters to determine periods of full operational efficiency and overall operational efficiency, it is understood that any other component of system 100, referred to generally as an "audit module," may perform one or more of such analyses and determinations (e.g., transaction server 110, data processing system 170, and/or management application 175 may be used as an audit module). For example, in certain embodiments, "raw" MDB information and/or DEX data 220 may be communicated from field asset 102 to data processing system 170, and management application 175 (and/or another component of data processing system 170) may then analyze MDB information and/or analyze DEX data 220 to determine one or more operational parameters associated with peripherals and other components of field asset 102. In the same or alternative embodiments, management application 175 (and/or another component of data processing system 170) may also analyze operational parameters to determine periods of full operational efficiency and/or overall operational efficiency of field asset 102.

For the sake of simplicity, only particular examples of operational parameters for peripherals and components of field asset 102 were discussed above (e.g., items in stock, not in exact change mode, card reader 212 operational, coin mechanism 214 operational, and bill validator 216 operational). However, is it understood that greater or fewer operational parameters may be utilized in accordance with the present disclosure. For example, in some embodiments, the determination of periods of full operational efficiency and/or the determination of overall operational efficiency may be determined independent of any periods that field asset 102 is not in exact change mode. As another example, captured MDB information and/or DEX data may analyzed to determine operational parameters other than those discussed above (e.g., mechanical jams in a vending mechanism, compressor failure, etc.) and such operational parameters may also be analyzed to determine periods of full operational efficiency and/or determine the overall operational efficiency of field asset 102.

Also, for the sake of simplicity, operational parameters, periods of operational efficiency, and overall operational efficiency in relation to field asset 102 were discussed with reference to FIGS. 3 and 4 as being measured over the course of a calendar week. However, it is understood that operational parameters, periods of operational efficiency, and overall operational efficiency in relation to field asset 102 may be measured, monitored, and or determined in relation to any suitable period of time, including without limitation hours, days, weeks, months, and/or years.

Utilizing the methods and systems disclosed herein, one may be able to track the operational efficiency of one or more field assets 102 and 103, as well as individual components thereof. By analyzing such operational efficiency (manually and/or automatically), one may be able to establish effective service, maintenance and repair schedules for each field asset 102 and 103, so as to increase the operational efficiency of such field asset, and potentially increase revenues realized from such field asset.

Although the present disclosure has been described with respect to specific preferred embodiments thereof, various changes and modifications may be suggested to one skilled in the art and it is intended that the present invention encompass such changes and modifications fall within the scope of the appended claims.

What is claimed is:

1. A method for monitoring the performance of a field asset comprising:
   capturing, by a extended function adapter, packets transmitted on a hared bus located in the field asset during normal operation of the field asset;
   analyzing the captured packets to determine both an operating state of the field asset and one or more operational parameters associated with one or more peripheral devices coupled to the shared bus,
   the operating state including at least one whether all inventory items of the field asset are in stock,
   the one or more operational parameters including at least whether each of the peripheral devices is operational and, for each peripheral device capable of dispensing change, whether the peripheral device is depleted of currency of a particular denomination; and
   analyzing the one or more operational parameters to determine an overall operational efficiency of the field asset, the overall operational efficiency equal to a ratio of a total amount of time that all items are in stock and every one of the one or more peripheral devices is concurrently operational to an overall period of time.

2. The method of claim 1, wherein the shared bus is a Multi Drop Bus (MDB) protocol compliant bus.

3. The method of claim 2, further comprising:
   capturing data exchange (DEX) protocol compliant data;
   analyzing the captured DEX data to determine one or more additional operational parameters associated with one or more components of the field asset; and
   analyzing the one or more additional operational parameters to determine the overall operational efficiency of the field asset.

4. The method of claim 1, further comprising communicating at least one of the operational parameters, additional operational parameters, and the overall operational efficiency to a transaction server communicatively coupled to the field asset.

5. The method of claim 3, wherein the one or more additional operational parameters comprise an indication that every inventory item of the field asset is in stock.

6. The method of claim 1, wherein at least one of the one or more peripheral devices include a coin mechanism, a bill validator, and a card reader.

7. The method of claim 1, wherein the field asset is a vending machine.

8. The method of claim 1, wherein the packets are captured by a snoop agent communicatively coupled to the shared bus.

9. A remotely located machine comprising:
   a machine controller configured to function as a master of a shared bus;
   one or more peripheral devices communicatively coupled to the bus, wherein the machine controller transmits packets to the peripheral devices via the shared bus;
   a snoop agent configured to capture packets transmitted on the shared bus during normal operation of the field asset; and
   an audit agent configured to:
      analyze the captured packets to determine both an operating state of the field asset and one or more operational parameters associated with the one or more peripheral devices,
      the operating state including at least whether all inventory items of the field asset are in stock, the one or more operational parameters including at least whether each of the peripheral devices is operational and, for each peripheral device capable of dispensing change, whether the peripheral device is depleted of currency of a particular denomination; and analyze the operating state and the one or more operational parameters to determine an overall operational efficiency of the field asset, the overall operational efficiency equal to a ratio of a total amount of time that all items are in stock and every one of the one or more peripheral devices is concurrently operational to an overall period of time.

10. The remotely located machine of claim 9, wherein the shared bus is a Multi Drop Bus (MDB) protocol compliant bus.

11. The remotely located machine of claim 10, wherein the snoop agent is implemented on an extended function adapter (EFA) communicatively coupled to the MDB.

12. The remotely located machine of claim 10, wherein the machine controller is a vending machine controller (VMC) communicatively coupled to the MDB via an MDB port of the VMC.

13. The remotely located machine of claim 12, further comprising the audit agent communicatively coupled to a DEX port of the VMC, the audit agent further configured to:
retrieve DEX data from the DEX port;
analyze the captured DEX data to determine one or more additional operational parameters associated with one or more components of the field asset; and
analyze the one or more additional operational parameters to determine the overall operational efficiency of the field asset.

14. The remotely located machine of claim 9, wherein at least one of the one or more peripheral devices include a coin mechanism, a bill validator, and a card reader.

15. The remotely located machine of claim 9, the audit agent further configured to communicate at least one of the operational parameters, additional operational parameters, and the overall operational efficiency to a transaction server communicatively coupled to the field asset.

16. The remotely located machine of claim 9, wherein the audit agent is further configured to analyze the one or more operational parameters to determine each interval of time during an overall period of time that every one of the one or more peripheral devices is concurrently operational.

17. A system for monitoring the performance of a field asset comprising:
a field asset including:
a machine controller configured to function as a master of a shared bus;
one or more peripheral devices communicatively coupled to the bus, wherein the machine controller transmits packets to the peripheral devices via the shared bus;
a snoop agent configured to capture packets transmitted on the shared bus during normal operation of the field asset; and
an audit module configured to:
analyze the captured packets to determine both an operating state of the field asset and one or more operational parameters associated with the one or more peripheral devices,
the operating state including at least one of whether all inventory items of the field asset are in stock and whether a vending mechanism of the field asset is jammed or obstructed,
the one or more operational parameters including at least whether each of the peripheral devices is operational and, for each peripheral device capable of dispensing change, whether the peripheral device is depleted of currency of a particular denomination; and
analyze the one or more operational parameters to determine an overall operational efficiency of the field asset, the overall operational efficiency equal to a ratio of a total amount of time that all items are in stock and every one of the one or more peripheral devices is concurrently operational to an overall period of time.

18. The system of claim 17, wherein the shared bus is a Multi Drop Bus (MDB) protocol compliant bus.

19. The system of claim 18, wherein the snoop agent is implemented on an extended function adapter (EFA) communicatively coupled to the MDB.

20. The system of claim 18, wherein the machine controller is a vending machine controller (VMC) communicatively coupled to the MDB via an MDB port of the VMC.

21. The system of claim 20, further comprising an audit agent communicatively coupled to a DEX port of the VMC, the audit agent configured to:
retrieve DEX data from the DEX port; and
communicate the DEX data to the audit module.

22. The system of claim 21, the audit module further configured to:
analyze the captured DEX data to determine one or more additional operational parameters associated with one or more components of the field asset; and
analyze the one or more additional operational parameters to determine the overall operational efficiency of the field asset.

23. The system of claim 17, wherein at least one of the one or more peripheral devices include a coin mechanism, a bill validator, and a card reader.

24. The system of claim 17, wherein the audit module is a transaction server communicatively coupled to the field asset.

25. The system of claim 17, wherein the audit module is further configured to analyze the one or more operational parameters to determine each interval of time during an overall period of time that every one of the one or more peripheral devices is concurrently operational.

26. The method of claim 1, further comprising:
analyzing the one or more operational parameters to determine each interval of time during the overall period of time that every one of the one or more peripheral devices is concurrently operational.

* * * * *